(12) United States Patent
Schleif et al.

(10) Patent No.: US 7,384,099 B2
(45) Date of Patent: Jun. 10, 2008

(54) APPARATUS AND A METHOD FOR ASSESSING AN ANCHORAGE POSITION

(75) Inventors: Kurt Schleif, Dearborn, MI (US); Robert Michel, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 446 days.

(21) Appl. No.: 10/904,603

(22) Filed: Nov. 18, 2004

(65) Prior Publication Data

US 2006/0103199 A1    May 18, 2006

(51) Int. Cl.
*A47C 1/10* (2006.01)

(52) U.S. Cl. .............. 297/253; 297/250.1; 297/217.2

(58) Field of Classification Search ........... 297/250.1, 297/253; 292/137, 150, 146
See application file for complete search history.

(56) References Cited

U.S. PATENT DOCUMENTS

| | | | | |
|---|---|---|---|---|
| 4,728,150 A * | 3/1988 | Gaudreau, Jr. | ............... | 297/383 |
| 5,125,695 A * | 6/1992 | Hartwell | ............... | 292/62 |
| 5,193,285 A * | 3/1993 | Heinrich et al. | ............ | 33/514.2 |
| 5,524,965 A * | 6/1996 | Barley | ............ | 297/256.16 |
| 5,971,479 A * | 10/1999 | Jacquemot et al. | .... | 297/256.14 |
| 6,183,044 B1 * | 2/2001 | Koyanagi et al. | ...... | 297/256.16 |
| 6,375,260 B1 * | 4/2002 | Hiramatsu et al. | ..... | 297/256.16 |
| 6,494,535 B2 * | 12/2002 | Galbreath | ............ | 297/253 |
| 6,669,288 B2 * | 12/2003 | Nakagawa et al. | .... | 297/256.16 |
| 6,764,135 B2 * | 7/2004 | Sasaki et al. | ........... | 297/256.16 |
| 6,854,414 B1 * | 2/2005 | Huntley | ............ | 114/364 |
| 7,093,896 B2 * | 8/2006 | Morita | ............ | 297/253 |

* cited by examiner

*Primary Examiner*—Sarah B McPartlin
(74) *Attorney, Agent, or Firm*—Frank A. MacKenzie; Brooks Kushman P.C.

(57) ABSTRACT

An apparatus for assessing a position of an anchorage of a child restraint anchorage system. The apparatus includes a frame, an engagement arm, and a latch pin. The engagement arm is adapted to receive the anchorage and is disposed proximate the frame. The latch pin is disposed at least partially within the engagement arm and is adapted to rotate to secure the engagement arm to the anchorage.

17 Claims, 4 Drawing Sheets

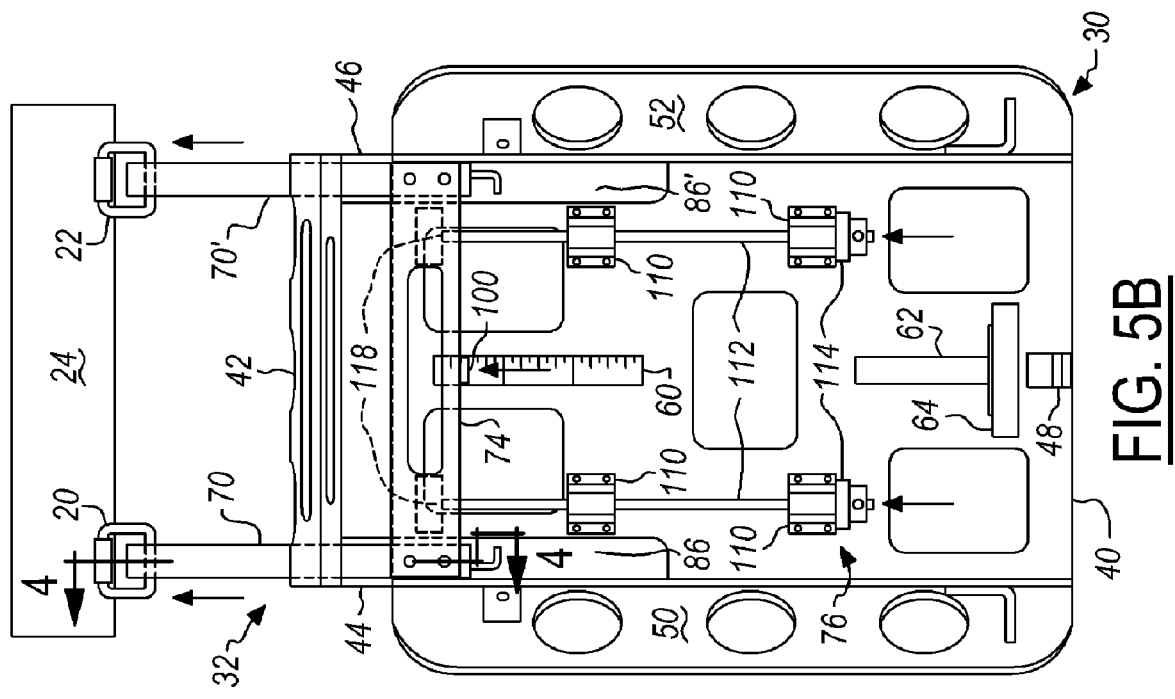
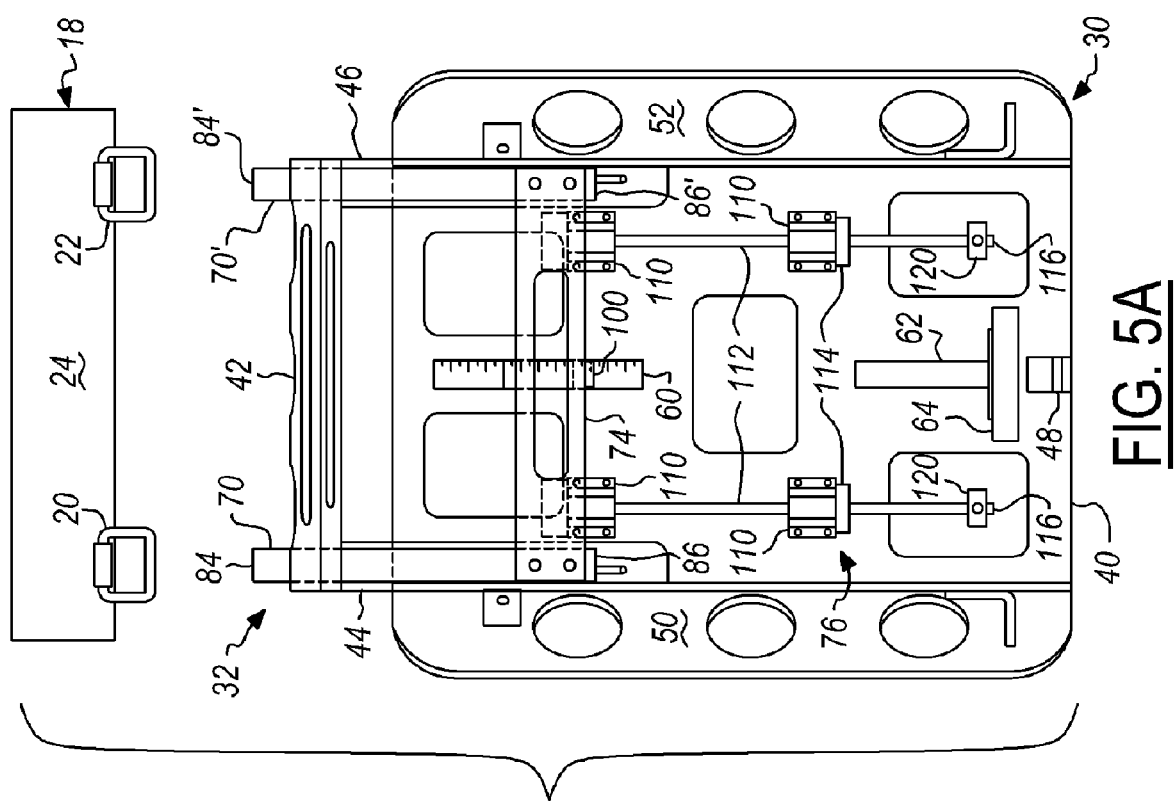

APPARATUS AND A METHOD FOR ASSESSING AN ANCHORAGE POSITION

BACKGROUND OF THE INVENTION

1. Field of the Invention

The present invention relates to an apparatus and a method for assessing the position of an anchorage of a child restraint anchorage system of a vehicle.

2. Background Art

Motor vehicles may include a child restraint anchorage system. A child restraint anchorage system uses a plurality of anchorages to transfer loads from a child safety seat to the vehicle structure. Anchorages may be located where they are partially concealed by or recessed from one or more vehicle surfaces, such as the surfaces of a vehicle seat. These surfaces may interfere with anchorage visibility and position assessments. Previously, vehicle surfaces were cut away and/or material was removed to allow the position of an anchorage to be evaluated. Such destructive evaluation techniques increase development costs.

Before applicant's invention, there was a need for an apparatus and a method for accurately assessing the position of an anchorage of a child restraint anchorage system. In addition, there was a need for an apparatus and a method that could be used with various child restraint anchorage designs and configurations. Moreover, there was the need for an apparatus that could be easily reconfigured to accommodate different seat designs. Also, there was the need for an easy-to-use apparatus and method to reduce training time and associated costs. Problems associated with the prior art as noted above and other problems are addressed by applicant's invention as summarized below.

SUMMARY OF THE INVENTION

According to one aspect of the present invention, an apparatus for assessing a position of an anchorage of a vehicle child restraint anchorage system is provided. The apparatus includes a frame, an engagement arm, and a latch pin. The engagement arm is disposed proximate the frame and is adapted to receive the anchorage. The engagement arm is also configured to move between an advanced position and a retracted position. The latch pin is disposed at least partially within the engagement arm and is adapted to rotate to secure the engagement arm to the anchorage. The apparatus permits the position of the anchorage to be accurately assessed without cutting or removing material from vehicle seat surfaces.

The apparatus may include a bolster panel configured to be selectively coupled to the frame. The bolster panel stabilizes the apparatus and better simulates frictional forces associated with installing a child safety seat.

The engagement arm may include a slot adapted to receive the anchorage. The slot may have a linear configuration.

The latch pin may include a first hook portion and a second hook portion. The first hook portion may be disposed proximate a first end of the latch pin and may be adapted to secure the anchorage. The second hook portion may be disposed proximate a second end of the latch pin and may be spaced apart from the engagement arm. The first and second hook portions may be disposed along first and second axes, respectively.

A scale may be disposed proximate the frame. The scale may be configured to indicate a position of the engagement arm relative to the frame.

According to another aspect of the present invention, an apparatus for assessing a position of first and second anchorages of a child restraint anchorage system disposed proximate a vehicle seat is provided. The apparatus includes a frame and an engagement mechanism. The engagement mechanism is disposed proximate the frame and is adapted to move between an advanced position and a retracted position. The engagement mechanism includes first and second engagement arms and first and second latch pins. The first engagement arm has a first slot for receiving the first anchorage and a first latch pin groove for receiving the first latch pin. The second engagement arm has a second slot for receiving the second anchorage and a second latch pin groove for receiving the second latch pin. The first and second latch pins are adapted to rotate to secure the first and second anchorages within the first and second slots.

The engagement mechanism may include a cross member disposed proximate the first and second engagement arms. The cross member may include a pointer and the frame may include a scale. The pointer may extend toward the scale to indicate a position of the engagement mechanism relative to the frame.

The engagement mechanism may include a plurality of guide blocks and a guide rail. The guide blocks may be disposed proximate the frame. The guide rail may be moveably disposed in the guide blocks and coupled to the cross member.

The apparatus may include a locking feature adapted to inhibit movement of the engagement mechanism.

The apparatus may include a pitch gauge and a roll gauge. The pitch and roll gauges may be adapted to indicate an orientation of the apparatus relative to a horizontal plane. The pitch gauge may be disposed perpendicular to the roll gauge.

According to another aspect of the present invention, a method for assessing a position of an anchorage of a vehicle child restraint anchorage system with an assessment apparatus is provided. The assessment apparatus includes an engagement mechanism moveable between an advanced position and a retracted position. The engagement mechanism includes an engagement arm, a latch pin, and a locking feature. The engagement arm has a slot adapted to receive an anchorage. The latch pin is adapted to secure the engagement arm to the anchorage. The locking feature is adapted to inhibit movement of the engagement mechanism between the advanced and retracted positions.

The method includes the steps of positioning the engagement arm in the advanced position, actuating the locking feature to inhibit movement of the engagement mechanism, positioning the slot to receive the anchorage, actuating the latch pin to secure the anchorage in the slot, actuating the locking feature to permit movement of the engagement mechanism, applying a predetermined load to move the apparatus from the advanced position toward the retracted position, actuating the locking feature to inhibit movement of the engagement mechanism, and measuring a distance traveled from the advanced position toward the retracted position.

The method may include measuring a pitch angle and a roll angle with the pitch and roll gauges. The method may include the step of installing a bolster panel before the step of positioning the engagement arm.

BRIEF DESCRIPTION OF THE DRAWINGS

FIG. 5A is a plan view of the apparatus in a retracted position.

FIG. 5B is a plan view of the apparatus in an advanced position.

DETAILED DESCRIPTION OF THE PREFERRED EMBODIMENT(S)

Figure 1:
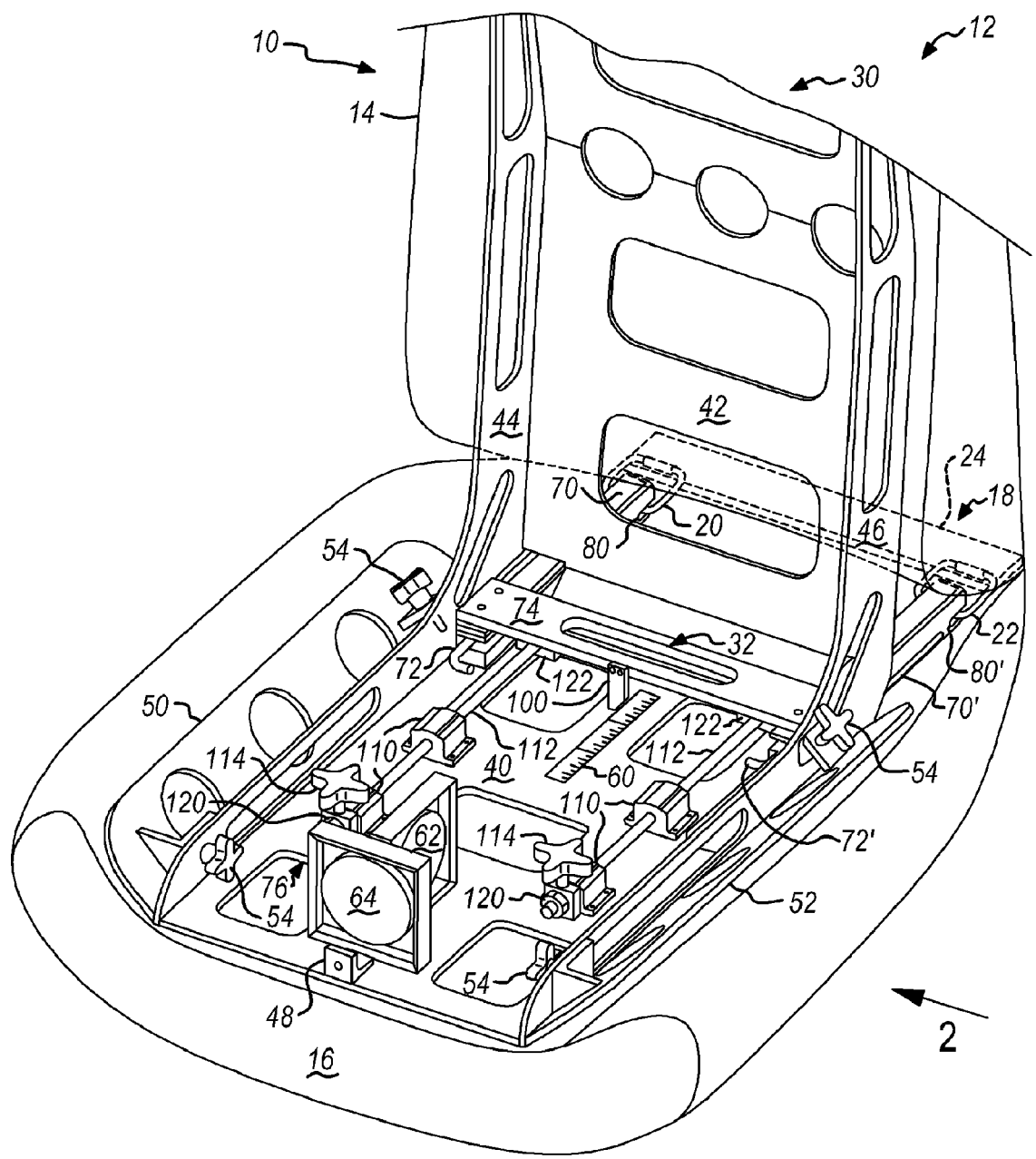
FIG. 1 is a perspective view of an apparatus for assessing a position of an anchorage.

Referring to FIG. 1, a vehicle seat 10 and an assessment apparatus 12 are shown.

The vehicle seat 10 includes a seat back 14 and a seat bottom 16. In addition, the vehicle seat 10 is associated with a child restraint anchorage system 18.

The child restraint anchorage system 18 includes one or more anchorages adapted to receive a component of a child restraint system, such as a mating feature of a child safety seat or a tether strap. The anchorages are adapted to transmit force from the child restraint system to the vehicle. In the embodiment shown, a first anchorage 20 and a second anchorage 22 are coupled to a bracket 24 that is attached to a portion of the vehicle. Alternatively, the bracket 24 may be omitted and the first and second anchorages 20,22 may be attached to another vehicle component, such as a vehicle seat frame.

The apparatus 12 is adapted to assess a position of one or more anchorages of the child restraint anchorage system 18. The apparatus 12 includes a frame 30 and an engagement mechanism 32 disposed proximate the frame 30.

The frame 30 includes a plurality of panels. In the embodiment shown in FIG. 1, the frame 30 includes a bottom panel 40, a back panel 42, a first side panel 44, and a second side panel 46. The first and second side panels 44,46 couple the bottom panel 40 to the back panel 42. Alternatively, the bottom panel 40 may be disposed proximate the back panel 42, thereby eliminating the side panels. The panels 40,42,44,46 may have any suitable configuration and may be made of any suitable material, such as a polymeric material or a metal like aluminum. Moreover, the panels 40,42,44,46 may be attached in any suitable manner, such as with an adhesive, fasteners, or by welding. In addition, the panels 40,42,44,46 may include a plurality of openings to reduce weight.

The bottom panel 40 may include a block 48 disposed opposite the back panel 42 for receiving a load force as will be described in greater detail below.

Optionally, the frame 30 may include one or more bolster panels. In the embodiment shown, a first bolster panel 50 is disposed proximate the first side panel 44 and a second bolster panel 52 is disposed proximate the second side panel 46. The bolster panels 50,52 extend above the bottom panel 40 at an angle to engage side bolster cushions of the vehicle seat, such as a bucket seat. The bolster panels 50,52 help position and stabilize the apparatus 12 and better simulate the frictional forces encountered when installing a child safety seat.

The first and second bolster panels 50,52 may be selectively coupled to the frame 30 in any suitable manner, such as with one or more fasteners 54. In the embodiment shown, the fasteners 54 extend between the first side panel 44 and the first bolster panel 50 and between the second side panel 46 and the second bolster panel 52. In this manner, the first and/or second bolster panels 50,52 may be removed from the frame 30 to reduce weight and/or to better accommodate vehicle seats that do not include side bolster cushions, such as a bench seat.

The frame 30 may also include one or more measuring devices adapted to measure or indicate the position or orientation of the apparatus 12 and anchorages. In the embodiment shown, the measuring devices include a scale 60, a pitch gauge 62, and a roll gauge 64.

The scale 60 is adapted to measure linear actuation or travel of the engagement mechanism 32 relative to the frame 30 as will be discussed in detail below. The scale 60 may have any suitable configuration. For instance, a 150 mm linear scale marked in suitable increments may be employed. The scale 60 may be attached to the frame 30 in any suitable location and in any suitable manner, such as with an adhesive or fastener. In the embodiment shown, the scale 60 is disposed on the bottom panel 40.

Figure 2:
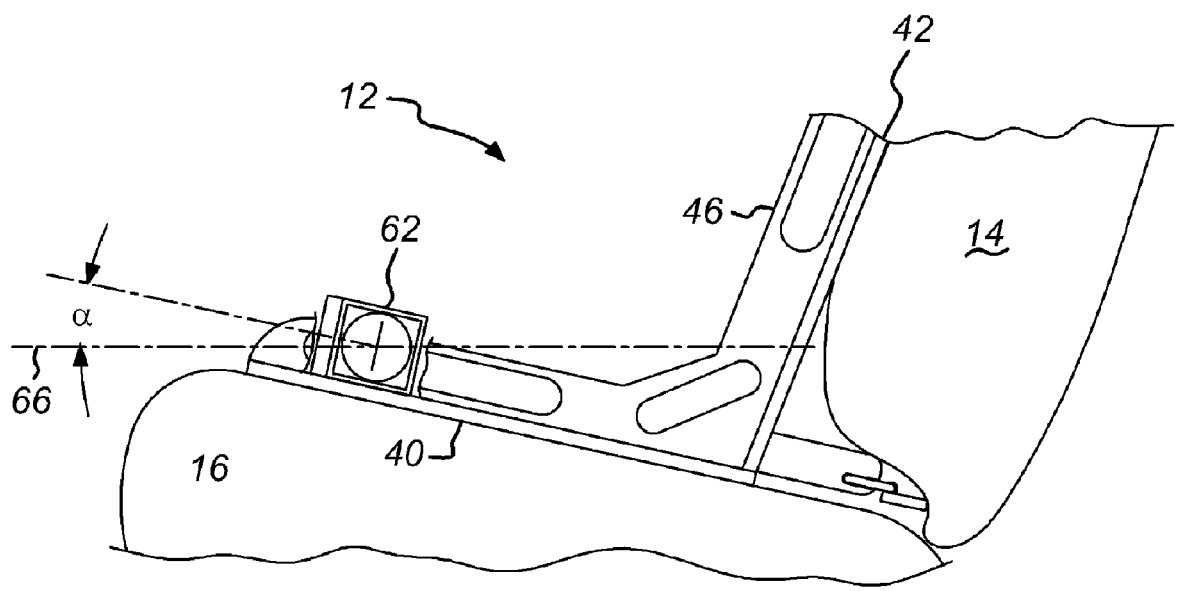
FIG. 2 is a schematic depicting a pitch angle of the apparatus.

The pitch gauge 62 is adapted to measure an angle of inclination or "pitch angle" of the apparatus 12. Referring to FIG. 2, the pitch angle, denoted $\alpha$, is shown graphically. The pitch angle is the angle formed by the bottom panel 40 or a plane disposed parallel to the bottom panel 40 relative to a horizontal plane 66.

Figure 3:
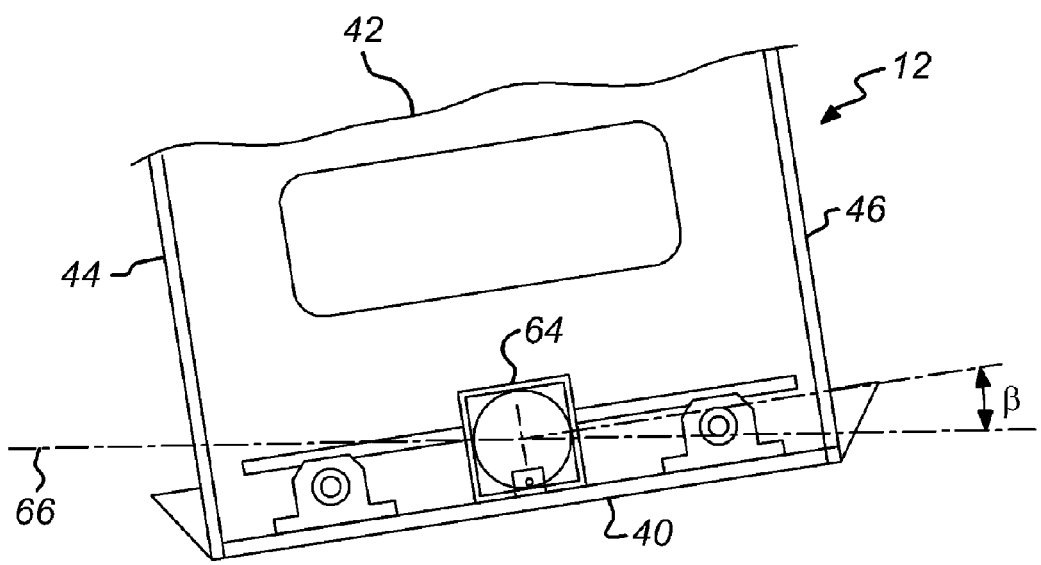
FIG. 3 is a schematic depicting a roll angle of the apparatus.

The roll gauge 64 is adapted to measure a "roll angle" of the apparatus 12. Referring to FIG. 3, the roll angle, denoted $\beta$, is shown graphically. The roll angle is an angle formed by the bottom panel 40 or a plane disposed parallel to the bottom panel 40 relative to the horizontal plane 66 along an axis disposed perpendicular to the pitch gauge 62.

The pitch and roll gauges 62,64 may be of any suitable type. For example, the pitch and roll gauges may be angle indicators, such as McMaster-Carr part number 20025A41.

Referring again to FIG. 1, one embodiment of the engagement mechanism 32 is shown. In this embodiment, the engagement mechanism 32 includes first and second engagement arms 70, 70', a first and second latch pins 72, 72', a cross member 74, and a guide mechanism 76.

The first and second engagement arms 70,70' are adapted to engage the first and second anchorages 20,22, respectively. The first and second engagement arms 70,70' may have the same or different configurations. In the embodiment shown, the first engagement arm 70 is configured as a mirror image of the second engagement arm 70'. Similarly, the first latch pin 72 is configured as a mirror image of the second latch pin 72'. The first engagement arm 70 and first latch pin 72 will be described in detail below. The description of analogous features of the second engagement arm 70' and second latch pin 72' is omitted for brevity. Moreover, the corresponding features of the second engagement arm 70' and second latch pin 72' are denoted with the same reference numbers and a prime (') symbol.

Figure 4A:
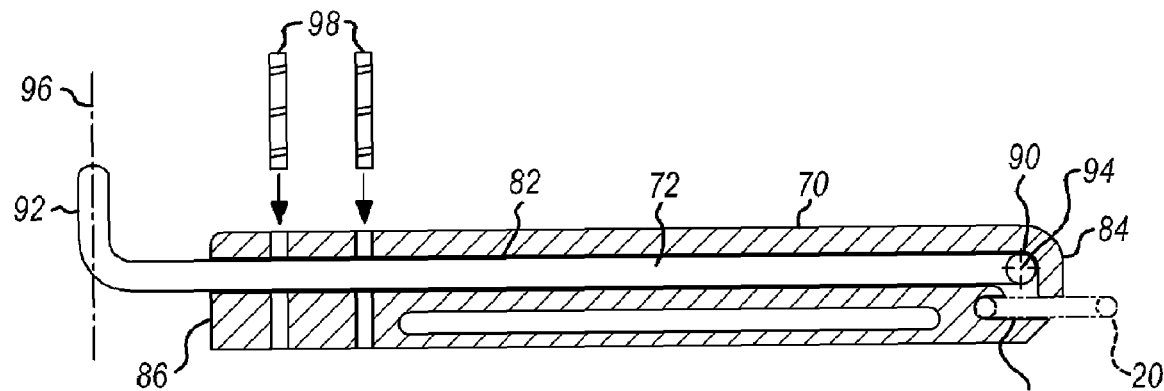
FIG. 4A is a section view of an engagement arm of the apparatus in an unlatched position.
Figure 4B:
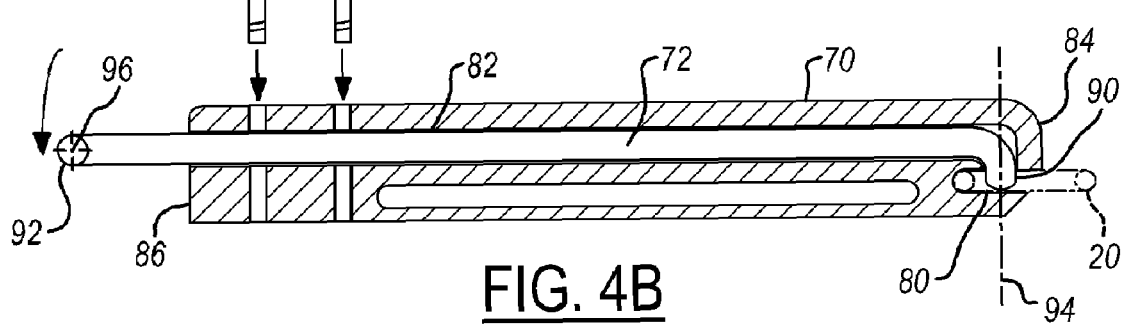
FIG. 4B is a section view of the engagement arm in a latched position.

Referring to FIGS. 4A and 4B, the first engagement arm 70 is shown in more detail. The first engagement arm 70 includes a slot 80 and a latch pin groove 82.

The slot 80 is adapted to receive the first anchorage 20 and may have any suitable configuration. In the embodiment shown, the slot 80 has a linear configuration and is disposed proximate a first end surface 84 of the first engagement arm 70. Alternatively, the slot 80 may have a non-linear configuration.

The latch pin groove 82 extends along the first engagement arm 70. The latch pin groove 82 includes a first end disposed proximate the slot 80 and a second end disposed proximate a second end surface 86 of the first engagement arm 70.

The first latch pin 72 is adapted to rotate in the latch pin groove 82. The first latch pin 72 may have any suitable configuration. In the embodiment shown, the first latch pin 72 includes a first hook portion 90 and an optional second hook portion 92.

The first hook portion 90 is disposed along a first axis 94 at any suitable angle relative to the latch pin groove 82. The first hook portion 90 is adapted to rotate toward the slot 80 to engage the first anchorage 20 as will be described in more detail below.

The second hook portion 92 extends from the first engagement arm 70 and is adapted to function as a handle to facilitate rotation of the first latch pin 72. The second hook portion 92 may have the same orientation or a different orientation than the first hook portion 90. In the embodiment shown, the second hook portion 92 is disposed along a second axis 96 disposed perpendicular to the first axis 94. Alternatively, the first and second axes 94,96 may be disposed at any angle relative to each other.

The first latch pin 72 is adapted to move between an unlatched position as shown in FIG. 4A and a latched position as shown in FIG. 4B. The first hook portion 90 is disposed outside the slot 80 when in the unlatched position and is disposed at least partially in the slot 80 in the latched position. More specifically, the first hook portion 80 is adapted to secure the anchorage in the slot 80 between the first hook portion 90 and the first engagement arm 70 to inhibit movement of the apparatus 12.

The first engagement arm 70 may include one or more retaining pins 98 adapted to hold the first latch pin 70 in the latch pin groove 82 yet permit the first latch pin 70 to rotate.

The cross member 74 is disposed proximate the first and second engagement arms 70,70'. The cross member 74 may have any suitable configuration and may be attached to the first and second engagement arms 70,70' in any suitable manner, such as with an adhesive, fasteners, or by welding. In addition, the cross member 74 may include a pointer 100 that extends toward the scale 60 to facilitate observation of the position of the engagement mechanism 32. In addition, the pointer reduces parallax error that may result from the spacing between the cross member 74 and the scale 60.

The guide mechanism 76 facilitates movement of the first and second engagement arms 70,70' between a retracted position as shown in FIG. 5A and an advanced position as shown in FIG. 5B. In the retracted position, the engagement mechanism 32 and engagement arms 70, 70' are disposed near the bottom panel 40. In the advanced position, the engagement mechanism 32 and engagement arms 70, 70' are moved away from the bottom panel 40. The guide mechanism 76 may have any suitable configuration. In the embodiment shown, the guide mechanism 76 includes a plurality of mounting blocks 110, a plurality of guide rails 112, and a plurality of locking features 114. Moreover, the guide mechanism may be configured to move over a wide distance range to accommodate different vehicles and anchorage system configurations.

The mounting blocks 110 are disposed proximate the frame 30 and may have any suitable configuration. In the embodiment shown in FIG. 1, the mounting blocks 110 are linear pillow block bearings attached to the bottom panel 40 with one or more fasteners.

The guide rails 112 are moveably associated with the mounting blocks 110. Each guide rail 112 includes a first end 116 and a second end 118 disposed opposite the first end 116. A collar 120 may be disposed proximate the first end 116 to prevent the guide rail 112 from disengaging from a mounting block 110. The second end 118 may be coupled to the cross member 74 in any suitable manner. In the embodiment shown, the second end 118 is disposed proximate a block 122 that is attached to the cross member 74.

The locking feature 104 may be associated with any component of the engagement mechanism 22 to selectively permit or inhibit movement between the advanced and retracted positions. In the embodiment shown, each locking feature 114 is adapted to inhibit movement of the guide rails 112. The locking features 114 may have any suitable configuration. In the embodiment shown, each locking feature 114 is configured as a threaded fastener that is adapted to selectively engage an associated guide rail 112. For example, the locking feature may be tightened to engage the guide rail 112 and loosened to disengage the guide rail 112.

Figure 6:
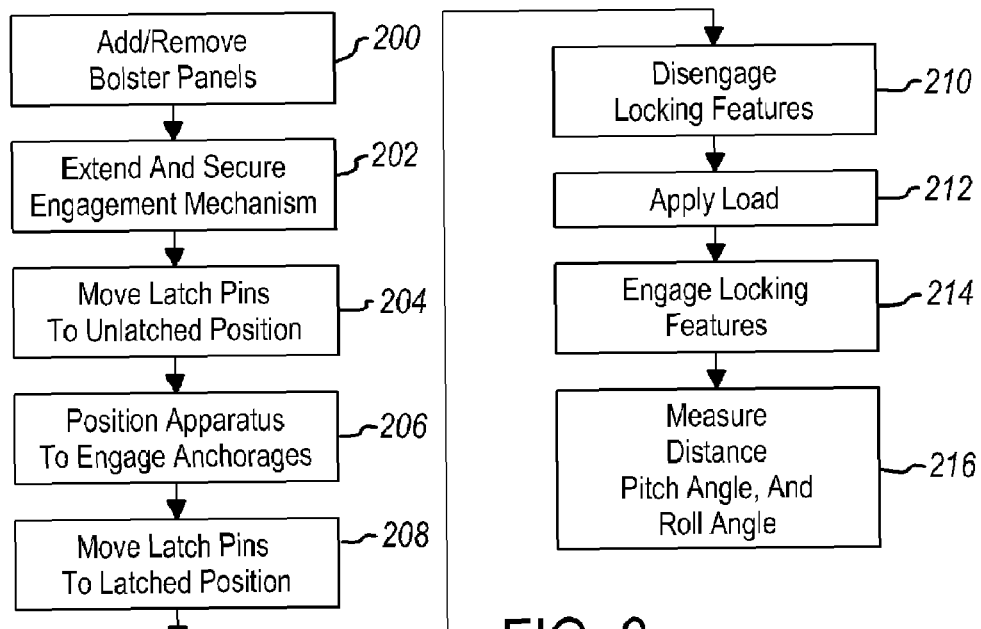
FIG. 6 is a flowchart of a method for assessing the position of an anchorage with the apparatus.

Referring to FIG. 6, a method for assessing the position of one or more anchorages of the child restraint anchorage system will now be described.

At 200, the bolster panels may be attached or removed from the frame as previously described to accommodate the seat configuration.

At 202, the engagement mechanism is positioned in the advanced position. In addition, the locking features are actuated to inhibit movement of the engagement mechanism toward the retracted position as previously described.

At 204, the latch pins are actuated to the unlatched position to permit the anchorages to be received in the engagement arm slots.

At 206, the apparatus is positioned on the vehicle seat such that the slots engage the first and second anchorages. Optionally, a cloth may be disposed between the bottom panel and the seat bottom to protect the seat cover and provide a more consistent sliding friction to facilitate vehicle-to-vehicle data comparisons.

At 208, the latch pins are actuated from the unlatched position to the latched position to secure the apparatus to the anchorages.

At 210, the locking features are actuated to permit the apparatus to move from the advanced position toward the retracted position.

At 212, a predetermined load force is applied against the frame to move the apparatus from the advanced position toward the retracted position. As the frame moves toward the retracted position, the back panel may contact and compress the seat back. For example, a predetermined load of 100N may be applied against the block 48 to move the frame toward the anchorages. The predetermined load may be applied at any suitable angle. For instance, the predetermined load may be applied at an angle generally parallel to the seat bottom, such as at approximately 15° above a horizontal plane. In addition, the predetermined load may be measured using a force gauge and applied until the force gauge indicates that the predetermined load has been provided.

At 214, the locking features are actuated to inhibit movement of the engagement mechanism between the advanced or retracted positions and to hold the apparatus in position.

At 216, various apparatus parameters are measured with the measuring devices. More specifically, the displacement of the engagement mechanism, pitch angle, and roll angle may be measured to determine the position and orientation of the anchorages. Moreover, the distance and/or angular positioning from an anchorage to a specific point of the apparatus may be of interest or be prescribed in an applicable manufacturer, industry, or government specification.

The pitch angle and roll angle denote angular positions of the anchorages relative to a horizontal plane. The scale indicates the apparatus displacement when the predetermined load is applied to simulate engagement of a child safety seat against the anchorages. As such, the measuring devices may be used to determine whether the anchorages are oriented within acceptable tolerances.

While the best mode for carrying out the invention has been described in detail, those familiar with the art to which this invention relates will recognize various alternative designs and embodiments for practicing the invention as defined by the following claims.

What is claimed is:

1. An apparatus for assessing a position of an anchorage of a vehicle child restraint anchorage system, the apparatus comprising:
   a frame;
   an engagement arm associated with the frame, the engagement arm being adapted to receive the anchorage and configured to move between an advanced position and a retracted position;
   a latch pin disposed at least partially within the engagement arm and adapted to rotate to secure the engagement arm to the anchorage; and
   a scale disposed on the frame, the scale having indicia to facilitate measuring of a distance between a point on the frame and a point on the engagement arm.

2. The apparatus of claim 1 further comprising a bolster panel configured to be selectively coupled to the frame.

3. The apparatus of claim 1 wherein the engagement arm further comprises a slot adapted to receive the anchorage.

4. The apparatus of claim 3 wherein the slot has a linear configuration.

5. The apparatus of claim 3 wherein the latch pin further comprises a first hook portion configured to secure the anchorage to the engagement arm.

6. The apparatus of claim 5 wherein the latch pin is configured to rotate between an unlatched position wherein the first hook portion is disposed outside the slot and a latched position wherein the first hook portion is disposed in the slot.

7. The apparatus of claim 5 wherein the latch pin further comprises a second hook portion disposed opposite the first hook portion, the second hook portion being spaced apart from the engagement arm.

8. The apparatus of claim 1 wherein the latch pin further comprises a first hook portion disposed proximate a first end and a second hook portion disposed proximate a second end, the first and second hook portions being disposed along first and second axes, respectively.

9. The apparatus of claim 1 further comprising a pointer that extends toward the scale to indicate a position of the engagement arm relative to the frame.

10. The apparatus of claim 1 further comprising a locking feature adapted to inhibit movement of the engagement arm.

11. An apparatus for assessing a position of first and second anchorages of a child restraint anchorage system disposed proximate a vehicle seat, the apparatus comprising:
    a frame;
    an engagement mechanism disposed proximate the frame and adapted to move between an advanced position and a retracted position, the engagement mechanism including:
      a first engagement arm having a first slot disposed at a first end for receiving the first anchorage, a second end disposed opposite the first end, and a first latch pin groove;
      a first latch pin rotatably disposed in the first latch pin groove the first latch pin rotating about an axis that extends from the first end to the second end of the engagement arm;
      a second engagement arm having a second slot for receiving the second anchorage and a second latch pin groove; and
      a second latch pin rotatably disposed in the second latch pin groove;
    wherein the first and second latch pins are adapted to secure the first and second anchorages within the first and second slots.

12. The apparatus of claim 10 wherein the engagement mechanism further comprises a cross member disposed proximate the first and second engagement arms.

13. The apparatus of claim 11 wherein the cross member further comprises a pointer and the frame further comprises a scale, wherein the pointer extends toward the scale to indicate a position of the engagement mechanism relative to the frame.

14. The apparatus of claim 11 wherein the engagement mechanism further comprises a plurality of guide blocks disposed proximate the frame and a guide rail moveably disposed in the guide blocks and coupled to the cross member.

15. The apparatus of claim 10 further comprising a locking feature adapted to inhibit movement of the engagement mechanism.

16. The apparatus of claim 10 further comprising a pitch gauge and a roll gauge adapted to indicate an orientation of the apparatus relative to a horizontal plane, the pitch gauge being disposed perpendicular to the roll gauge.

17. The apparatus of claim 10 wherein the first latch pin further comprises a first hook portion adapted to secure the first anchorage within the first slot and the second latch pin further comprises a second hook portion adapted to secure the second anchorage within the second slot.

* * * * *